(12) United States Patent
Shen et al.

(10) Patent No.: US 10,277,428 B2
(45) Date of Patent: Apr. 30, 2019

(54) METHODS FOR REDUCING COMPLEXITY OF PRE-CODING MATRIX COMPUTATION AND GROUPING OF USER EQUIPMENTS IN MASSIVE MIMO SYSTEMS

(71) Applicant: Ping Liang, Irvine, CA (US)

(72) Inventors: Junyang Shen, Irvine, CA (US); Dengkui Zhu, Beijing (CN); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 10 days.

(21) Appl. No.: 15/742,366

(22) PCT Filed: Jul. 9, 2016

(86) PCT No.: PCT/US2016/041667
§ 371 (c)(1),
(2) Date: Jan. 5, 2018

(87) PCT Pub. No.: WO2017/011359
PCT Pub. Date: Jan. 19, 2017

(65) Prior Publication Data
US 2018/0219703 A1    Aug. 2, 2018

Related U.S. Application Data

(60) Provisional application No. 62/190,966, filed on Jul. 10, 2015.

(51) Int. Cl.
*H04B 7/04* (2017.01)
*H04B 7/06* (2006.01)
*H04L 1/00* (2006.01)
*H04L 25/03* (2006.01)
*H04B 7/0456* (2017.01)

(52) U.S. Cl.
CPC .......... *H04L 25/0391* (2013.01); *H04B 7/04* (2013.01); *H04B 7/0456* (2013.01); *H04B 7/06* (2013.01); *H04B 7/0617* (2013.01); *H04B 7/0663* (2013.01); *H04L 1/00* (2013.01); *H04L 25/03* (2013.01)

(58) Field of Classification Search
CPC .. H04B 7/0413; H04B 7/0617; H04B 7/0456; H04B 7/0417; H04B 7/0639
See application file for complete search history.

(56) References Cited

U.S. PATENT DOCUMENTS

| 2012/0113897 A1* | 5/2012 | Thiele | H04B 7/024 370/328 |
| 2012/0177142 A1* | 7/2012 | Wagner | H04B 7/0452 375/296 |
| 2014/0098689 A1* | 4/2014 | Lee | H04B 7/0469 370/252 |

(Continued)

*Primary Examiner* — Shuwang Liu
*Assistant Examiner* — Gina M McKie
(74) *Attorney, Agent, or Firm* — Guosheng Wang; United States Research and Patent Firm (57) ABSTRACT

This invention presents methods for using spatial FFT to reduce the number of computations for generating the pre-coding matrix in a MIMO system comprising reducing the dimension of channel vectors by neglecting entries whose values are significantly smaller or near zero, and to select UEs into a group assigned to the same time and frequency resources.

6 Claims, 5 Drawing Sheets

(56) References Cited

U.S. PATENT DOCUMENTS

2015/0358055 A1* 12/2015 Molisch ............... H04B 7/0608
  370/329
2016/0088648 A1*  3/2016 Xue ..................... H04B 7/0452
  370/252
2016/0352012 A1* 12/2016 Foo ......................... H01Q 3/40

* cited by examiner

METHODS FOR REDUCING COMPLEXITY OF PRE-CODING MATRIX COMPUTATION AND GROUPING OF USER EQUIPMENTS IN MASSIVE MIMO SYSTEMS

This application claims the benefit of U.S. Provisional Application No. 62/190,966, filed on Jul. 10, 2015.

FIELD OF THE INVENTION

This invention relates generally to novel transceiver designs to reduce the complexity of pre-coding matrix computation and grouping of User Equipment (UEs) in massive Multiple-Input Multiple Output (MIMO) systems.

BACKGROUND

With the proliferation of mobile applications, the demand for higher throughput of wireless systems is increasing at a staggering pace. The massive MIMO system is a key technology to handle orders of magnitude higher data traffic for the coming applications [1]. The massive MIMO technique is based on spatial multiplexing that enables multiple data streams to multiple UEs concurrently. The large number of antennas focusing energy into individual UEs brings huge improvements in throughput and radiated energy efficiency. To enable the gain of the large number of antennas, significant effort of computation is needed at each Base Station (BS), e.g., pre-coding matrix computation.

The concept of massive MIMO systems is to enable signals from all antennas adding up constructively at the desired UEs. To achieve this goal, the BS needs to first estimate the channel between each antenna and each UE, and then performs beamforming. One of the biggest challenges for massive MIMO systems is that the computation complexity of beamforming may be too high for real-time implementation. For example, with M BS antennas and K single-antenna UEs, employing Zero-Forcing (ZF) beamforming, the system needs to perform $O(MK^2)$ complex-valued multiplications and an inversion of a K×K matrix for every channel coherence bandwidth in the frequency domain and for every channel coherence time (e.g., one or more milliseconds) in the time domain.

Due to the superior performance over conjugate beamforming with the same number of served UEs on the same time-frequency resource, the ZF method has been considered as a promising method to achieve high throughput for many UEs. It has been shown that the ZF method is able to achieve the performance very close to the channel capacity in massive MIMO systems [1]. Previous inventions have been proposed to reduce the complexity of ZF pre-coding. In [2], a Neumann Series (NS) based method is proposed to improve the speed of matrix inversion. The NS based method was later improved with a higher probability to converge by our patent application PCT/US15/52386. To the best of our knowledge, no previous method has been proposed to reduce the complexity of the $O(MK^2)$ complex-valued multiplication. The overall ZF pre-coding consists of two stages, i.e., the matrix multiplication and the matrix inversion. Note that the complexity of matrix multiplication $O(MK^2)$ is much larger than the complexity of matrix inversion $O(K^3)$ since the value of M is always much larger than K in massive MIMO systems. Therefore, it is very important to design an efficient method to reduce the complexity of matrix multiplication.

One embodiment of this invention is an innovative method to reduce the complexity of matrix multiplication in pre-coding matrix computation for a massive MIMO system. The design consists of spatial Fast Fourier Transform (FFT) that converts each signal vector of signals at different BS antennas to a sparse one. The reason that the output of the spatial FFT is a sparse vector is because the arriving signals are from limited angles reflected by limited spatial reflectors. With these sparse vectors, the multiplication of two matrices, which are essentially multiplications of the vectors in the matrices, can be simplified since many entries of the vectors are almost zeros.

Another embodiment of this invention is to perform fast UE grouping using the spatial FFT method. In massive MIMO systems, since many UEs need to be served, they need to be scheduled into different groups so that each group is served on the same time-frequency resource. One general rule is to schedule low-correlated UEs in the same group, which is able to construct a diagonally dominant correlation matrix, for an easier NS implementation. With the spatial FFT method, the complexity of grouping is also reduced.

DETAILED DESCRIPTION OF THE PREFERRED EMBODIMENTS

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof.

Figure 1:
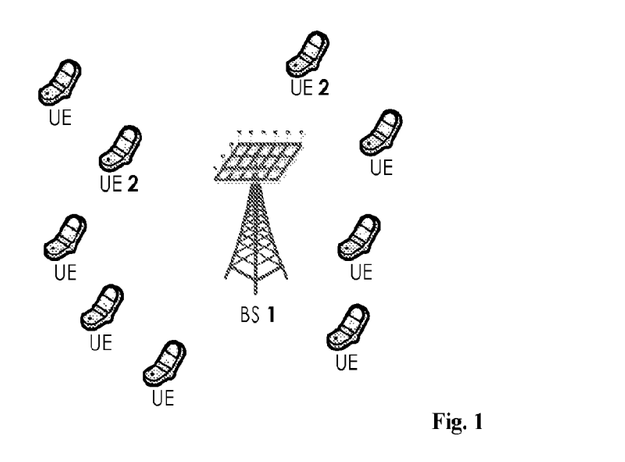
FIG. 1 shows the system model of a massive MIMO system.

The system model of the massive MIMO system is shown in FIG. 1, where a BS 1 with a large number of antennas serves many UEs 2 at the same time-frequency resource. For the sake of simplicity, single-antenna UEs are assumed below. However, this invention can be easily generalized to the case of multiple-antenna UEs.

The reason that the massive MIMO system is able to achieve high throughput is to enable signals from the BS antennas adding up constructively at the desired UEs, which requires accurate estimation of the channels between UEs and the BS antennas. Let $h_{k,m}$ denote the channel between the kth UE and the mth BS antenna. The BS estimates the channels between each antenna and each UE. Assume that the channel matrix between the BS and UEs is denoted by a K×M matrix H with the entry on the kth row and the mth column being $h_{k,m}$, where k=1, . . . , K, and m=1, . . . , M.

The ZF pre-coding algorithm is an efficient linear pre-coding algorithm to achieve the performance close to the theoretical capacity of a massive MIMO system. Let s=$[s_1, \ldots, s_K]^T$ be the information signal vector from the BS and y=$[y_1, \ldots, y_M]^T$ be the received signal at the UEs, where $s_k$ is the data symbol intended for the kth UE and $y_k$ is the received signal at the kth UE. Let the M×K pre-coding matrix be G, then the input output relation is $$y = HGs. \quad (1)$$

For the ZF pre-coding algorithm, G is evaluated as $$G = H^H(HH^H)^{-1} \quad (2)$$

It can be shown that with the ZF pre-coding, the product of HG is a diagonal matrix, indicating that no interference is among the served UEs.

The G matrix needs to be calculated within the channel coherence time. Note that given the estimation of H, the computation of G includes three steps, which are listed below.

Step 1: The computation of $W = HH^H$;
Step 2: The computation of $W^{-1}$;
Step 3: The computation of $H^H W^{-1}$.

Since is H a K×M matrix, the complexity levels of Step 1 and Step 3 above are both $O(MK^2)$. The complexity level of Step 2 above is $O(K^3)$. Note that in massive MIMO systems, the value of M is always much larger than K, e.g., M=512, and K=32. Therefore, the complexity levels of Step 1 and Step 3 are the bottleneck of pre-coding computation.

The rest of this invention focuses on methods for reducing the computations of Step 1 and Step 3. One embodiment of this invention is to use spatial FFT to reduce the dimension of the row vectors of H. The entry of W on the ith row and the jth row is evaluated as $W_{i,j} = h_i h_j^H = \sum_{m=1}^{M} h_{i,m} h_{j,m}^*$, where $h_{k,m}$ is the channel between the kth UE and the mth BS antenna. With spatial FFT, the dimension of the kth row of H, $h_k$, can be reduced because many entries of $h_k$ are near zero. Then, when computing W, these entries with near zero values can be neglected, so the number of multiplications can be reduced to speed up the process of Step 1.

Principle of Spatial Fast Fourier Transform

The received signals arrive at a massive MIMO BS with limited angles, and the number of major angles $N_a$, i.e., angles that capture the most of signal power, is less than the number of antennas M. Therefore, if the directions of the arrived signals are known, the correlation coefficients among UEs can be obtained by only considering the signals in the dimension of major angles $N_a$ instead of the dimension of BS antennas M. The spatial FFT can be used to map the signals to different angles. Compared to other options to map M-dimensional signals into other spaces, spatial FFT has advantages listed below.

1. Easy implementation: the symmetric property of FFT enables M log(M) complexity of implementation, and there are designs that can be implemented in the Radio Frequency (RF) domain for the spatial FFT process.
2. Spatial FFT naturally matches the nature of signal propagation: since the signals are reflected by limited reflectors and arrive at a BS at different angles, spatial FFT fits the nature of signal propagation by mappings the signals into the spatial domain.

Assume that the channel for the kth UE is $h_k$, then the spatial FFT of $h_k$ is denoted as $\tilde{h}_k = FFT(h_k) = h_k P_{FFT}$, where $P_{FFT}$ is the FFT matrix with the entry on the ith row and the jth column being $w^{ij}$ with $$w = \frac{1}{\sqrt{M}} e^{\frac{2\pi\sqrt{-1}}{M}}.$$

Figure 2:
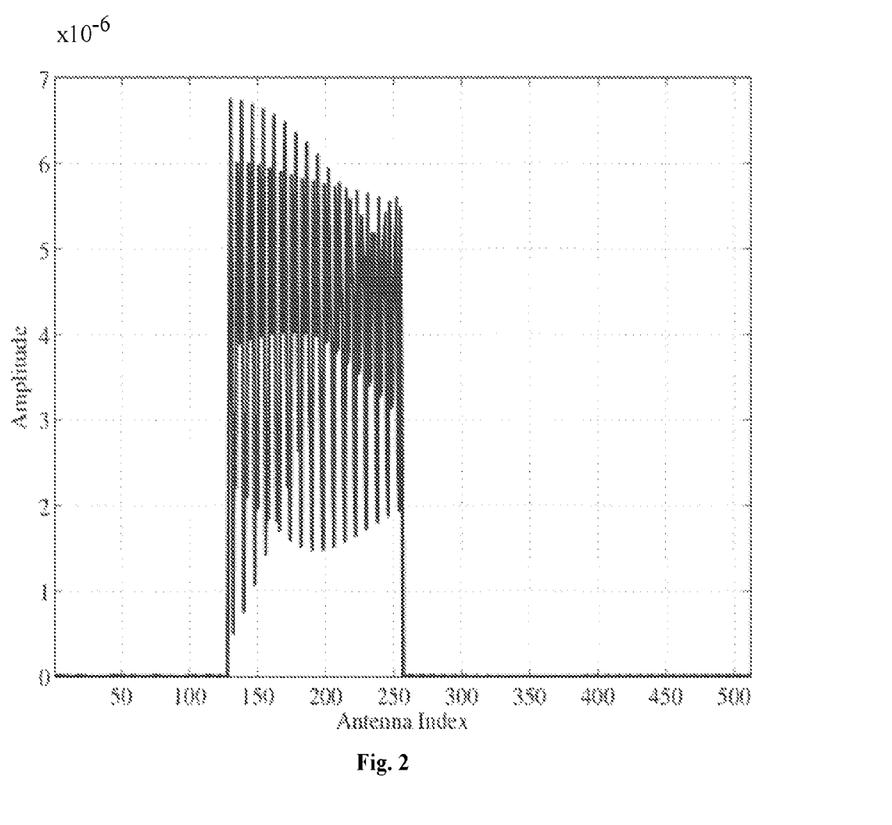
FIG. 2 shows the received signals at massive MIMO antennas before the spatial FFT block for an example.
Figure 3:
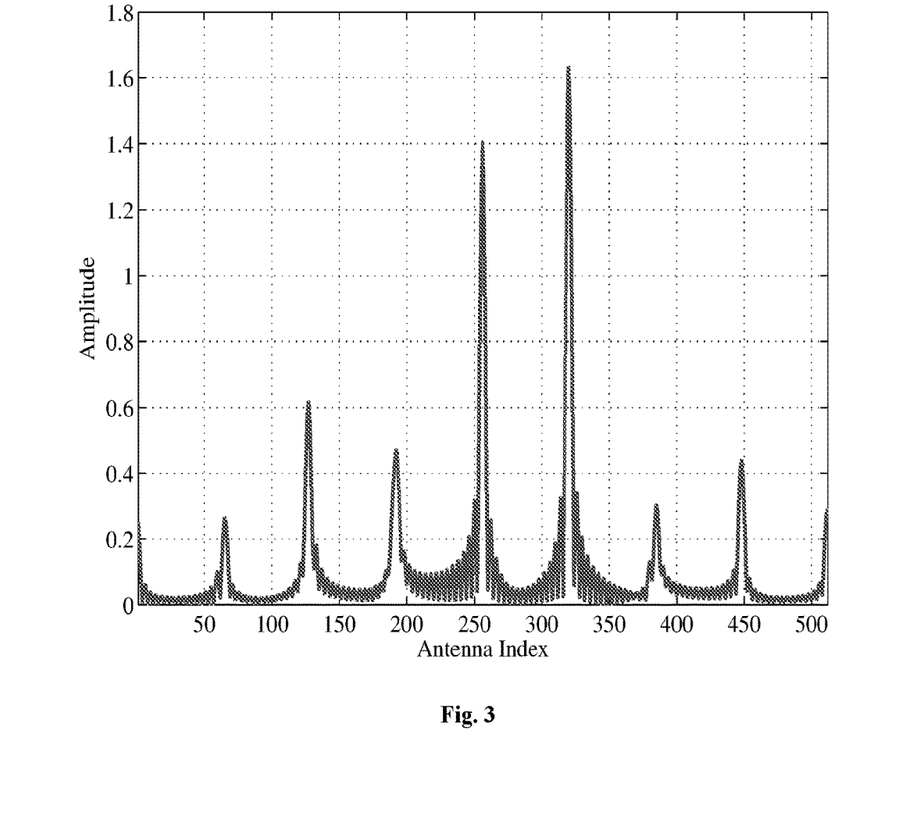
FIG. 3 shows the received signals at massive MIMO antennas after the spatial FFT block for an example.

FIG. 2 shows the received signals generated according to the Long-Term Evolution (LTE) standard at the 512 antennas of a massive MIMO BS for an example. After spatial FFT, the received signals are shown in FIG. 3 for the same example. As shown in FIG. 3, only a limited number of angles has strong signal power. Therefore, in the subsequent signal processing, only the signals in these angle bins need to be considered. One strategy is to choose the $N_a$ angles, so that these angle bins contain p percent of the total power.

Implementation of Spatial FFT

Another embodiment is the architecture to implement the spatial FFT algorithm. This embodiment includes two methods for implementing the spatial FFT algorithm, i.e., FFT in the digital domain and FFT in both the analog and digital domains.

Figure 4:
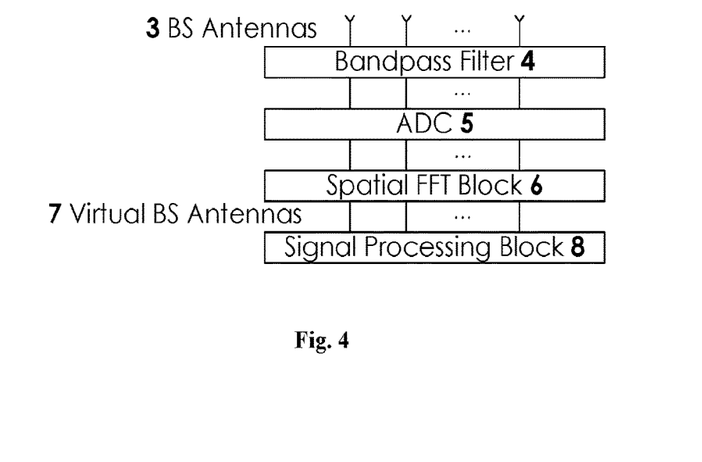
FIG. 4 shows the block diagram of a receiver of a massive MIMO BS with the spatial FFT block.

One method is the structure of digital-domain spatial FFT shown in FIG. 4. Specifically, the received signals at BS antennas 3 are first passed through the bandpass filter 4 and the Analog-to-Digital Converter (ADC) 5 to become digital samples, which are then passed through the spatial FFT block 6. For easy understanding, the output of the spatial FFT block is called Virtual BS antennas 7. Then, the channel vector between the kth UE to the Virtual BS antennas is $\tilde{h}_k = h_k P_{FFT}$, where $h_k$ is the channel row vector between the kth UE and real BS antennas. After it, $\tilde{h}_k$ is passed to the signal processing block 8 to conduct the signal processing. Note that this spatial FFT block can be used in both the uplink and the downlink, though FIG. 4 only shows an example of the uplink. Another embodiment of this invention is to perform the baseband signal processing functions with spatial FFT such as detection, time or frequency offset estimation, decoding, etc. Since the outputs of the spatial FFT block is considered as virtual BS antennas, these signal processing functions are performed on each virtual BS antenna as illustrated in FIG. 4. In other words, since the spatial FFT block is included in the channels between BS and UE antennas, all the baseband signal processing functions are performed after the virtual BS antennas.

Figure 5:
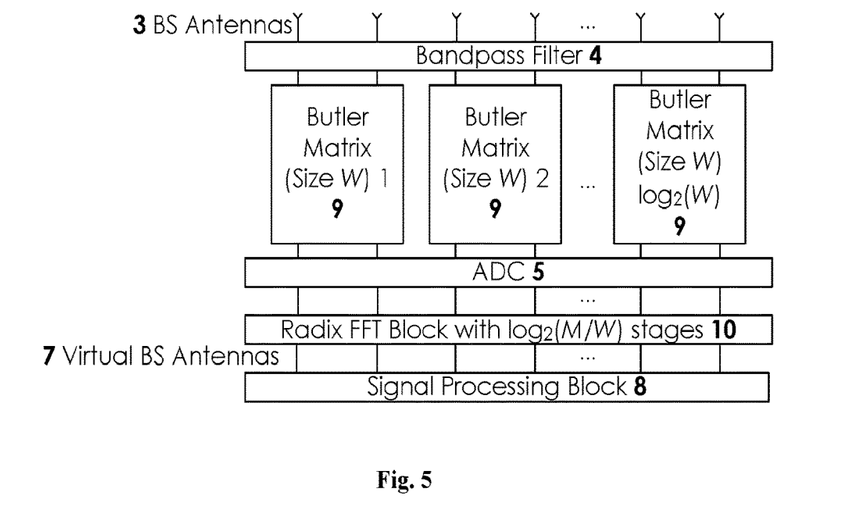
FIG. 5 shows the block diagram of a receiver of a massive MIMO BS with the Butler matrix blocks and the radix spatial FFT block.

Another method is the spatial FFT block consisting of both analog and digital parts as shown in FIG. 5. If the number of BS antennas is too large, the complexity of the digital-domain spatial FFT block might be too high. To reduce the complexity, the Butler matrix 9 can be used to perform FFT in the RF domain [3]. The Butler matrix uses wires to implement the analog FFT function, so that the signals passing through the Butler matrix automatically conduct FFT. Note that the size of Butler matrix also could not be too large due to the nature of its implementation. Normally, the size of Butler Matrix could be up to 8 [3]. Hence, this method proposes to use the digital radix FFT block 10 combined with the Butler matrix to perform spatial FFT as shown in FIG. 5.

The design of combining the Butler matrix and the digital radix FFT block is based on the following principle. For the signal sequence x[n] with the length N, it can be divided into two sequences with the length of N/2, i.e., $s_1[n] = x[2n]$ and $s_2[n]=x[2n+1]$. Let $S_1[k]$ and $S_2[k]$ denote the FFTs of $s_1[n]$ and $s_2[n]$ respectively. Then, the FFT of $x[n]$ can be computed as $$X[k] = S_1[k] + G_2[k], \quad (3)$$

$$X[k + N/2] = S_1[k] - G_2[k],$$

where $k = 0, 1, \ldots, N/2 - 1$, and $$G_2[k] = W_N^k S_2[k] \text{ with } W_N^k = \cos\frac{2\pi}{N}k - j\sin\frac{2\pi}{N}k.$$

Therefore, to compute FFT with the length N, the number of complex-valued multiplications is reduced from $N^2$ to $(N/W)\log_2(N/W)$, where W is the size of a implemented Butler Matrix. For example, if N=512 and W=8, the complex-valued multiplication complexity is reduced from 262144 to 384, only 0.15% of the complexity with the Butler matrix and the digital radix FFT block.

ZF Pre-Coding Based on Spatial FFT

Figure 6:
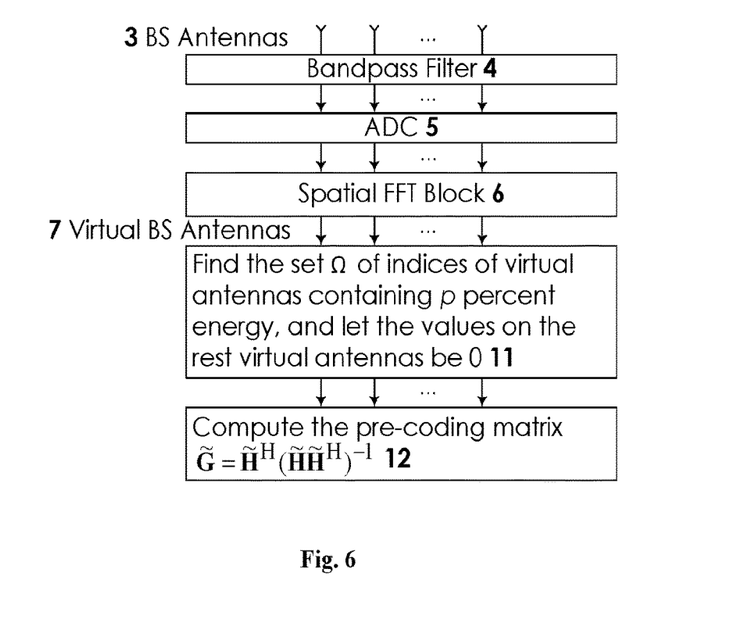
FIG. 6 shows the process of pre-coding computation with the spatial FFT block.
Figure 7:
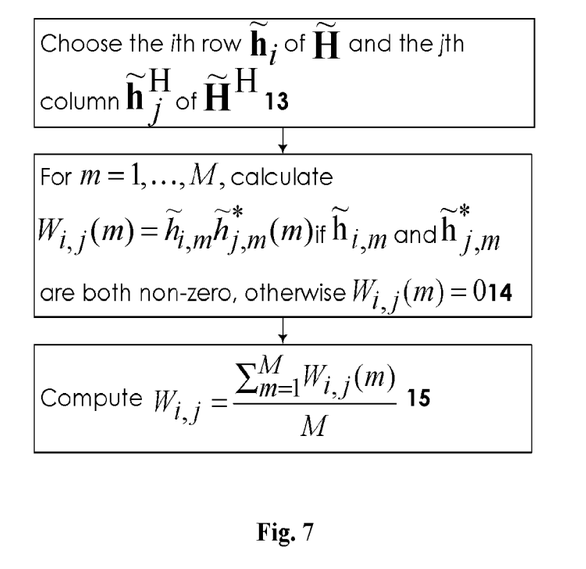
FIG. 7 shows the process of computing the correlation coefficient between two UEs.

Another embodiment of this invention is the procedure to reduce the complexity of pre-coding matrix computation based on the spatial FFT block, which is shown in FIG. 6. After the spatial FFT block 6, the set $\Omega$ of indices of virtual BS antennas containing p percent energy is found, and the values on the rest virtual BS antennas are set to be 0 11. The channel matrix between the UEs and the virtual BS antennas is $\tilde{H}=HP_{FFT}$, where H is the channel matrix between the UEs and the real BS antennas, and $P_{FFT}$ is the FFT matrix. Then, the pre-coding matrix of ZF for the virtual BS antennas is calculated as $\tilde{G}=\tilde{H}^H(\tilde{H}\tilde{H}^H)^{-1}$ 12. Note that the row vectors of $\tilde{H}$ are sparse after spatial FFT, so the computation of $W=\tilde{H}\tilde{H}^H$ is simplified. The procedure of computing the entry on the ith row and the jth column of W, $W_{i,j}$, is shown in FIG. 7. Specifically, the ith row $\tilde{h}_i$ of $\tilde{H}$ and the jth column $\tilde{h}_j^H$ of $\tilde{H}^H$ are first selected 13. Next, the product $W_{i,j}(m)$ is calculated as $W_{i,j}(m)=\tilde{h}_{i,m}\tilde{h}_{j,m}^*$, if $\tilde{h}_{i,m}$ and $\tilde{h}_j^H$ are both non-zero, otherwise $W_{i,j}(m)=0$ 14, where $\tilde{h}_{i,m}$ and $\tilde{h}_{j,m}^*$ are the mth elements of $\tilde{h}_i$ and $\tilde{h}_j^H$ respectively with m=0, 1, ..., M. After that, $W_{i,j}$ is computed as $W_{i,j}=\sum_{m=1}^{M}W_{i,j}(m)/M$ 15, where $W_{i,j}$ is optionally normalized.

Figure 8:
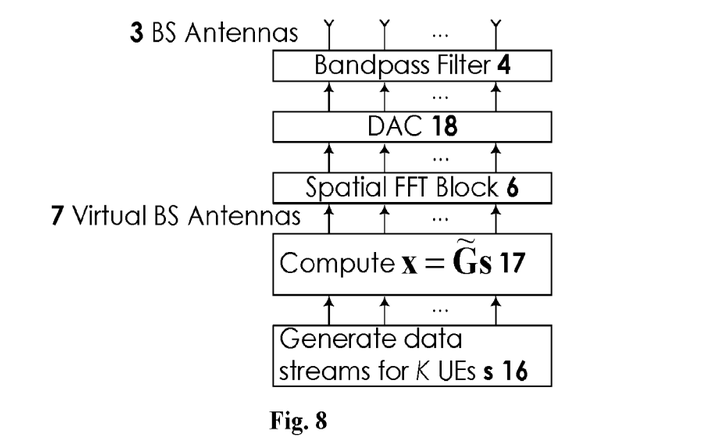
FIG. 8 shows the process of transmission of multi-user data streams at a massive MIMO BS with the spatial FFT block.

After the computation of the pre-coding matrix $\tilde{G}$, the process to transmitted signals to K UEs on the same time-frequency resource is illustrated in FIG. 8. Specifically, the K×1 information data vector s is first generated 16. Then, s is multiplied by the pre-coding matrix $\tilde{G}$ to compute the M×1 precoded data vector x to be sent through virtual BS antennas 17. Next, x is passed through the spatial FFT block, the Digital-to-Analog Converter (DAC) 18, the bandpass filter, and sent out by the real BS antennas.

UE Grouping Based on Spatial FFT

Another embodiment of this invention is to perform UE grouping based on the correlation coefficient between any two UEs computed with the spatial FFT block.

Since the number of active UEs in wireless systems is generally much larger than the supported UEs on one time-frequency resource, the BS needs to select and group K UEs for one time-frequency resource for multi-user transmission. Several criteria can be followed to group UEs. One criterion is to schedule UEs with small correlation coefficients among them in the same group. In this way, the system throughput is generally higher because the correlation coefficients among these UEs are low, and the NS theory for computing the inverse of $\tilde{H}\tilde{H}^H$ is easier to converge.

Figure 9:
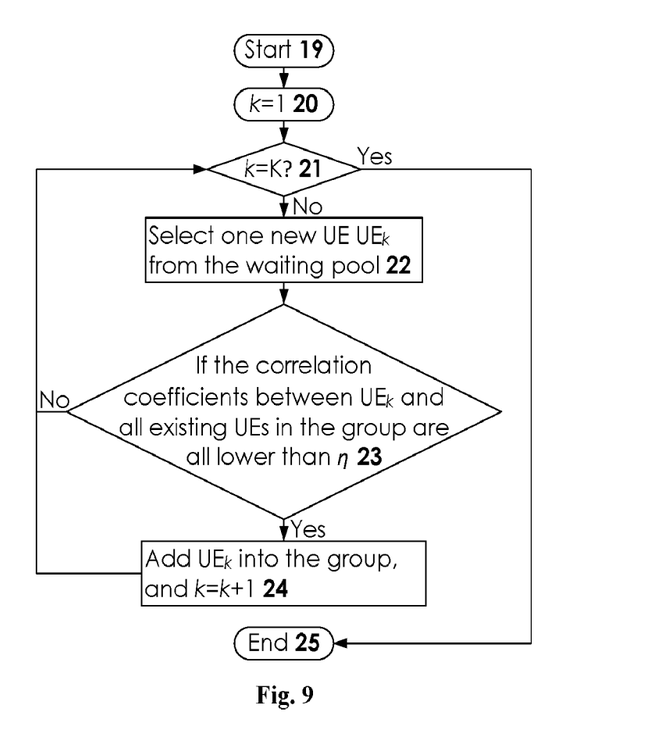
FIG. 9 shows the process of UE grouping.

The correlation coefficient between the ith and the jth UEs is essentially evaluated by $W_{i,j}$. The problem of UE grouping is to select K UEs from the pool of UEs waiting to be served. The procedure of UE grouping is shown in FIG. 9. For every new UE, the process checks the correlation coefficients between it and the existing UEs in the group. If the correlation coefficients between it and all the existing UEs are all below a threshold $\eta$, it is added into the group. Otherwise, the next UE in the pool is selected until all the K UEs are selected. Specifically, after the process starts 19, k=1 20. Next, whether k=K is checked 21. If k≠K, one new UE $UE_k$ is selected from the waiting pool 22. Then, whether the correlation coefficients between $UE_k$ and all existing UEs in the group are all lower than $\eta$ is checked 23. If yes, $UE_k$ is added into the group, k=k+1 24, and the process jumps back to 21 and continues. Otherwise, the process directly jumps back to 21 and continues. At 21, if k=K, the process ends 25.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

REFERENCE

[1]. F. Rusek, D. Persson, B. K. Lau, E. G. Larsson, T. L. Marzetta, O. Edfors, and F. Tufvesson, "Scaling up MIMO: Opportunities and Challenges with Very Large Arrays," IEEE Signal Process. Mag., vol. 30, no. 1, pp. 40-46, January 2013.

[2]. H. Prabhu, J. Rodrigues, O. Edfors, and F. Rusek, "Approximative Matrix Inverse Computations for Very-Large MIMO and Applications to Linear Pre-coding Systems," in Proc. IEEE WCNC 2013, Shanghai, China, April 2013, pp. 2710-2715.

[3]. E. Bialkowski, F.-C. E. Tsai, Y.-C. Su, and K.-H. Cheng, "Design of Fully Integrated 4×4 and 8×8 Butler Matrices in Microstrip/Slot technology for Ultra Wideband Smart Antennas" in Proc. 2008 IEEE Antennas and Propagation Society International Symposium, San Diego, Calif., USA, July 2008.

We claim:

1. A method for Multiple-Input Multiple Output (MIMO) systems comprising
   computing a MIMO pre-coding matrix, and
   reducing the dimension of channel vectors by neglecting entries whose values are significantly smaller or near zero in order to reduce the complexity of the MEMO pre-coding matrix computation,
   wherein said reducing the dimension of channel vectors further comprises
      using spatial Fast Fourier Transform (FFT) to map signals at a MIMO BS to $N_a$ major angles that capture most of the signal power wherein $N_a$ is less than the number of antennas M; and in the subsequent signal processing, only signals that fall in the bins of these major angles are included.

2. The method of claim 1 wherein the spatial FFT process is implemented in the digital-domain comprising processing the received signals at BS antennas using a bandpass filter and an Analog-to-Digital Converter to obtain digital samples; transforming the digital samples using a spatial FFT block; and using the output of the spatial FFT block as virtual BS antennas.

3. The method of claim 2 further comprising performing baseband signal processing on the signals associated with the virtual BS antennas.

4. The method of claim 1 further comprising implementing the spatial FFT process in the Radio Frequency (RF) domain.

5. The method of claim 4 wherein a Butler matrix is used to perform FFT in the RF domain.

6. The method of claim 1 further comprising implementing the spatial FFT process using a digital radix FFT block combined with a Butler matrix.

* * * * *